March 15, 1927.  A. A. EDWARDS ET AL  1,621,318
ANT TRAP
Filed Feb. 5, 1924
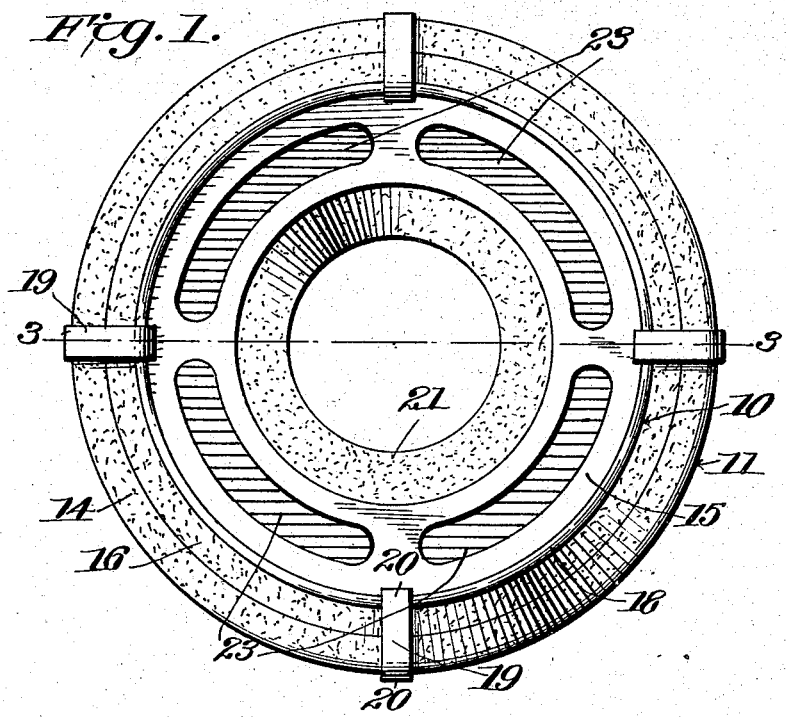
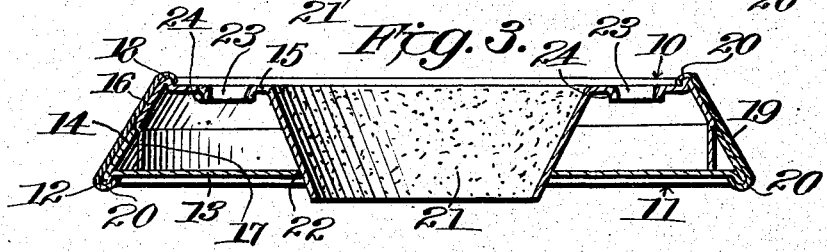
INVENTOR,
A. A. Edwards and
R. L. McDonald,
BY Frank Fuller
ATTORNEY.

Patented Mar. 15, 1927.

1,621,318

UNITED STATES PATENT OFFICE.

ARTIST A. EDWARDS AND ROBERT L. McDONALD, OF WILSON, OKLAHOMA.

ANT TRAP.

Application filed February 5, 1924. Serial No. 690,713.

This invention relates to a trap to catch ants and particularly red ants.

It is aimed to provide an efficient, inexpensive trap, which may be readily emptied and cleaned, and one which is otherwise characterized by the novel details and features of construction embodied in the practical form shown by way of example in the accompanying drawings.

In said drawings;

Figure 1 is a plan view of the trap;

Figure 2 is a side elevation thereof, and

Figure 3 is a sectional view taken on the line 3—3 of Figure 1.

Like reference characters designate like or corresponding parts in the different views.

Referring specifically to the drawings, the parts of the trap are preferably made of sheet metal or other suitable material, preferably so that the same may be pressed into shape from blanks or sheets. The trap essentially consists of an upper section 10 and a lower section 11. Section 11 is adapted to rest on the ground and has a marginal bead 12 at the junction of its lower wall 13 with an upstanding side wall 14. Section 10 has a top wall 15 from which a side wall 16 depends and which terminates in a flange 17 removably telescoping into section 11 and particularly frictionally binding against the upper edge of wall 14 and resting on bottom wall 13. A bead 18 is formed at the junction of walls 15 and 16. Clips 19 consisting of metallic strips of resilient material fit against the walls 14 and 16 and have hook ends 20 which clasp the beads 12 and 18.

Integral with wall 15 and depending therefrom is an annular entrance wall 21 which passes removably through and snugly fits an opening 22 in wall 13 and extends below the latter wall.

The wall 21 and composite outer side wall 14—16 are preferably inclined upwardly in converging relation and are exteriorly coated or roughened as suggested by the stippling in the drawing so that an efficient surface for travel of the ants to wall 15 is afforded. Said coating may consist of sand glued or secured to the said walls in the manner of sand paper.

The space within the trap constitutes a captive chamber into which the ants topple from wall 15 through openings 23 in said wall. Flanges 24 depend marginally of said openings from wall 15. The upper surface of wall 15 is extremely smooth and polished so that the ants cannot secure a good foothold thereon and in their travel over the same will fall into the captive chamber through openings 23.

In using the trap, the same is placed on the ground with the wall 21 partly entering the ant hole. The ants on leaving the hole will travel up the wall 21 onto the wall 15. Similarly stray ants in endeavoring to return to their hole will travel up the walls 13 and 16 onto wall 15. The ants from wall 15 will fall into the captive chamber through the openings 23. At desired times, the sections 10 and 11 may be separated for cleaning or removal of the ants, by pulling them apart after removing the clips 19.

Changes may be resorted to within the spirit and scope of the invention.

We claim as our invention:—

An ant trap having a lower section provided with an upstanding inclined marginal wall and a substantially central opening, an upper section having a depending wall provided with an inclined portion flush with the first inclined portion and a portion in telescopic relation with the said wall, an entrance wall depending from the upper section through and below said opening, the interior of the trap constituting a captive chamber, and the upper section having an entrance to said chamber intermediate said depending wall and said entrance wall, said sections having beads integral therewith at the margins of their upper and lower walls, respectively, clips resiliently clasping said beads, and flanges depending from said upper wall marginally of said entrance.

In testimony whereof we affix our signatures.

ARTIST A. EDWARDS.
ROBERT L. McDONALD.